(12) United States Patent
Tonogai et al.

(10) Patent No.: US 12,090,666 B2
(45) Date of Patent: Sep. 17, 2024

(54) PATH GENERATION DEVICE, PATH GENERATION METHOD, AND RECORDING MEDIUM STORING PATH GENERATION PROGRAM

(71) Applicant: OMRON Corporation, Kyoto (JP)

(72) Inventors: Norikazu Tonogai, Nara (JP); Haruka Fujii, Kyotanabe (JP); Takeshi Kojima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 486 days.

(21) Appl. No.: 17/275,315

(22) PCT Filed: Nov. 27, 2019

(86) PCT No.: PCT/JP2019/046326
§ 371 (c)(1),
(2) Date: Mar. 11, 2021

(87) PCT Pub. No.: WO2020/149021
PCT Pub. Date: Jul. 23, 2020

(65) Prior Publication Data
US 2021/0260763 A1    Aug. 26, 2021

(30) Foreign Application Priority Data
Jan. 15, 2019  (JP) .................. 2019-004311

(51) Int. Cl.
*B25J 9/16*  (2006.01)
*B25J 13/08*  (2006.01)

(52) U.S. Cl.
CPC .......... *B25J 9/1666* (2013.01); *B25J 9/1671* (2013.01); *B25J 13/089* (2013.01)

(58) Field of Classification Search
CPC ...... B25J 9/1605; B25J 9/1676; B25J 9/1697; B25J 9/1656; B25J 9/1661; B25J 9/1674;
(Continued)

(56) References Cited

U.S. PATENT DOCUMENTS 5,561,742 A    10/1996  Terada et al.
9,981,383 B1 *  5/2018  Nagarajan .............. B25J 9/1666
(Continued)

FOREIGN PATENT DOCUMENTS

CN    101512453 A    8/2009
CN    106255471 A    12/2016
(Continued)

OTHER PUBLICATIONS

Li-xin et al., "Investigation of joint clearance effects on the dynamic performance of a planar 2-DOF pick-and-place parallel manipulator," Oct. 2, 2013 (Year: 2013).*
(Continued)

*Primary Examiner* — Adam R Mott
*Assistant Examiner* — Byron Xavier Kasper
(74) *Attorney, Agent, or Firm* — Morgan, Lewis & Bockius LLP

(57) ABSTRACT

A path generation device including an acquisition unit, a setting unit, and a path generation unit. The acquisition unit is configured to acquire pose information relating to an initial pose and a target pose of a robot, position information relating to a position of the robot, obstacle information including a position of an obstacle present in a range of interference with the robot, and specification information relating to a specification including a shape of the robot. The setting unit is configured to, based on a positional relationship between the robot and the obstacle, set a clearance amount representing an amount of clearance to avoid the
(Continued)

interference for at least one out of the robot or an obstacle present in a range of interference with the robot.

12 Claims, 15 Drawing Sheets

(58) Field of Classification Search
CPC ...... B25J 9/1666; B25J 9/1671; B25J 13/089; B25J 9/1664; G05B 19/4061; G05B 2219/49143; G05B 2219/24145; G05B 2219/40476; G05B 2219/40519; A61B 6/102

See application file for complete search history.

(56) References Cited

U.S. PATENT DOCUMENTS

| | | | |
|---|---|---|---|
| 2003/0225479 A1* | 12/2003 | Waled | B25J 9/161 |
| | | | 700/245 |
| 2010/0204828 A1 | 8/2010 | Yoshizawa et al. | |
| 2015/0239121 A1 | 8/2015 | Takeda | |
| 2016/0112694 A1 | 4/2016 | Nishi et al. | |
| 2017/0129100 A1 | 5/2017 | Takeda et al. | |
| 2017/0203443 A1* | 7/2017 | Lessing | B25J 15/10 |
| 2017/0348856 A1 | 12/2017 | Nakaya et al. | |
| 2017/0361464 A1* | 12/2017 | Sasaki | B25J 9/1687 |
| 2018/0161978 A1 | 6/2018 | Naitou | |
| 2018/0235565 A1 | 8/2018 | Azizian et al. | |
| 2018/0236657 A1* | 8/2018 | Kuwahara | B25J 9/1671 |
| 2018/0281191 A1 | 10/2018 | Sinyavskiy et al. | |
| 2018/0311834 A1 | 11/2018 | Ichibangase et al. | |
| 2019/0015985 A1* | 1/2019 | Kim | B25J 9/1697 |
| 2019/0176348 A1* | 6/2019 | Bingham | B25J 9/1697 |
| 2019/0187703 A1* | 6/2019 | Millard | B25J 9/0003 |
| 2019/0216555 A1* | 7/2019 | DiMaio | A61B 34/00 |

FOREIGN PATENT DOCUMENTS

| | | |
|---|---|---|
| CN | 107000223 A | 8/2017 |
| CN | 108177162 A | 6/2018 |
| CN | 108453702 A | 8/2018 |
| CN | 108780320 A | 11/2018 |
| CN | 108789482 A | 11/2018 |
| JP | H05-204428 A | 8/1993 |
| JP | H05-250023 A | 9/1993 |
| JP | H09-034524 A | 2/1997 |
| JP | 2003-280710 A | 10/2003 |
| JP | 2007-313592 A | 12/2007 |
| JP | 2009-032189 A | 2/2009 |
| JP | 2009-233757 A | 10/2009 |
| JP | 2010-052093 A | 3/2010 |
| JP | 2015-160277 A | 9/2015 |
| JP | 2016-078184 A | 5/2016 |
| JP | 2018-134703 A | 8/2018 |

OTHER PUBLICATIONS

International Search Report issued in corresponding International Patent Application No. PCT/JP2019/046326 dated Feb. 18, 2020.
Written Opinion issued in corresponding International Patent Application No. PCT/JP2019/046326 dated Feb. 18, 2020.
Chinese Office Action dated Nov. 30, 2023 issued in corresponding Chinese Patent Application No. 201980059699.X.
Extended European Search Report issued in corresponding European Patent Application No. 19910467.0 dated Aug. 29, 2022.
Office Action (with partial translation) dated May 10, 2024, issued in corresponding Chinese Patent Application No. 201980059699.X.

* cited by examiner

| SETTING SUBJECT | CLEARANCE AMOUNT (mm) |
|---|---|
| JOINT J1 | 10 |
| JOINT J2 | 10 |
| JOINT J3 | 10 |
| JOINT J4 | 5 |
| JOINT J5 | 5 |
| JOINT J6 | 5 |
| BOX | 5 |
| SHELF | 5 |
| CAMERA STAND | 10 |
| ⋮ | ⋮ |

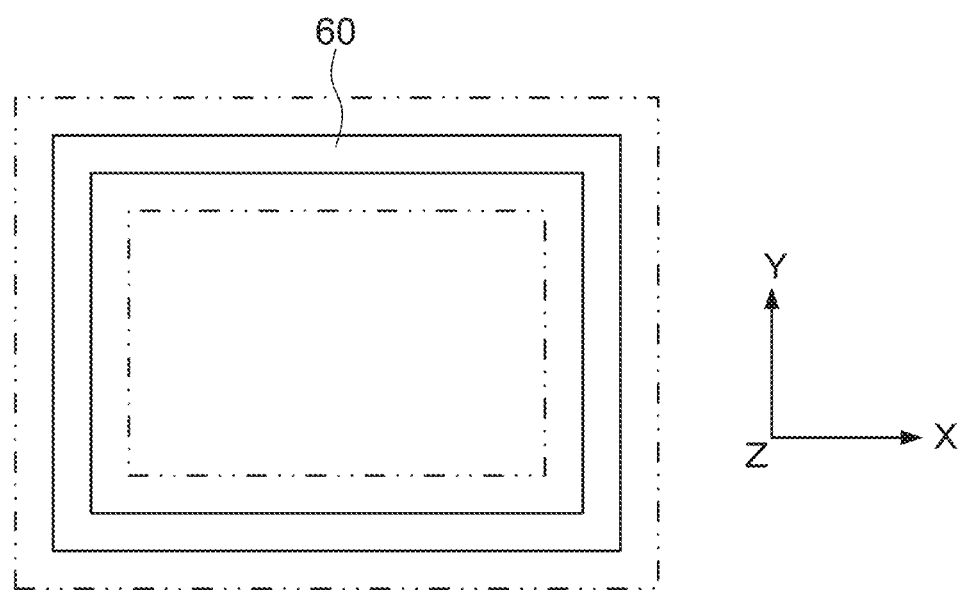

PATH GENERATION DEVICE, PATH GENERATION METHOD, AND RECORDING MEDIUM STORING PATH GENERATION PROGRAM

TECHNICAL FIELD

The present invention relates to a path generation device, a path generation method, and a path generation program.

BACKGROUND ART

A robot simulation device for executing a simulation of an action program for a robot is disclosed in Patent Document 1. The robot simulation device includes an action path acquisition unit to acquire an first action path, a taught point identification unit to detect occurrence of interference on the first action path and identify a first taught point and a second taught point that are taught points before and after such interference, an action path generation unit to automatically insert at least one third taught point between the first and second taught points based on search directions and search distances determined by random numbers and to generate second action paths such that interference does not occur, an evaluation unit to perform evaluation of each of the second action paths based on at least one predetermined parameter, and an action path selection unit to select an optimum action path from the plural second action paths based on the evaluation.

When generating a path for movement of a robot, a path is generated such that the robot does not interfere with an obstacle, namely, so as to maintain a safe distance for a distance between the robot and any obstacle. Hitherto, a clearance amount representing a safe distance between a robot and an obstacle has been set the same in each instance for the robot or for the obstacle.

PRIOR ART DOCUMENTS

Patent Documents

Patent Document 1: Japanese Patent Application Laid-Open (JP-A) No. 2015-160277

SUMMARY OF INVENTION

Technical Problem

In cases in which a clearance amount is set the same in each instance for the robot or for the obstacle, if for example the clearance amount of a box for containing the workpiece is set large to raise safety in a pick-and-place device, then there is a higher probability of a fail in picking workpieces at corners of the box. This leads to a drop in the overall picking success rate. However, if the clearance amount is set small to raise the picking success rate, then this leads to a drop in safety. Namely, there is an increase in the risk of the robot interfering with an obstacle.

The success rate of actions of the robot such as picking and the safety of actions of the robot are accordingly in a trade-off relationship, and achieving both is difficult.

In consideration of the above circumstances, an object of the present invention is to provide a path generation device and path generation program capable of preventing a drop in safety of actions of a robot while also preventing a drop in the success rate of actions of the robot.

Solution to Problem

A first aspect of the disclosure is a path generation device including an acquisition unit, a setting unit, and a path generation unit. The acquisition unit is configured to acquire pose information relating to an initial pose and a target pose of a robot, position information relating to a position of the robot, obstacle information including a position of an obstacle present in a range of interference with the robot, and specification information relating to a specification including a shape of the robot. The setting unit is configured to, based on a positional relationship between the robot and the obstacle, set a clearance amount representing an amount of clearance to avoid the interference for at least one out of the robot or an obstacle present in a range of interference with the robot. The path generation unit is configured to generate path information related to a path of the robot based on the initial pose and the target pose of the robot, the position of the robot, the position of the obstacle, the shape of the robot, and the clearance amount set by the setting unit.

The first aspect described above may be configured such that in cases in which the path generated by the path generation unit has not been satisfied a predetermined path condition the setting unit makes the clearance amount smaller, and the path generation unit re-generates the path information based on the initial pose and the target pose of the robot, the position of the robot, the position of the obstacle, the shape of the robot, and the clearance amount set by the setting unit.

The first aspect described above may be configured such that in cases in which the obstacle includes a cavity and also the obstacle is either for containing a workpiece subject to manipulation by the robot or for placing the workpiece on, the setting unit sets the clearance amount smaller than a clearance amount for an obstacle not including a cavity.

The first aspect described above may be configured such that the setting unit computes a speed or acceleration of a joint of the robot based on the path information, and in case in which the computed speed or acceleration of the joint of the robot is a predetermined threshold or more, makes the clearance amount larger such that the speed or acceleration becomes less than the predetermined threshold.

The first aspect described above may be configured such that the setting unit receives an adjustment coefficient to adjust the clearance amount, and adjusts plural of the clearance amounts based on the received adjustment coefficient.

The first aspect described above may be configured to further include a display control unit configured to control so as to differentiation display of the obstacle according to the clearance amount.

A second aspect of the disclosure is a path generation method in which a computer executes processing. The processing includes: an acquisition process of acquiring pose information relating to an initial pose and a target pose of a robot, position information relating to a position of the robot, obstacle information including a position of an obstacle present in a range of interference with the robot, and specification information relating to a specification including a shape of the robot; a setting process of, based on a positional relationship between the robot and the obstacle, setting a clearance amount representing an amount of clearance to avoid the interference for at least one out of the robot or an obstacle present in a range of interference with the robot; and a path generation process of generating path information related to a path of the robot based on the initial pose and the target pose of the robot, the position of the robot, the position of the obstacle, the shape of the robot, and the clearance amount set by the setting process.

A third aspect of the disclosure is a path generation program to cause a computer to function as an acquisition unit, a setting unit, and a path generation unit. The acquisition unit acquires pose information relating to an initial pose and a target pose of a robot, position information relating to a position of the robot, obstacle information including a position of an obstacle present in a range of interference with the robot, and specification information relating to a specification including a shape of the robot. The setting unit, based on a positional relationship between the robot and the obstacle, sets a clearance amount representing an amount of clearance to avoid the interference for at least one out of the robot or an obstacle present in a range of interference with the robot. The path generation unit generates path information related to a path of the robot based on the initial pose and the target pose of the robot, the position of the robot, the position of the obstacle, the shape of the robot, and the clearance amount set by the setting unit.

Advantageous Effects of Invention

The present invention enables a drop in safety of actions of a robot to be prevented while also preventing a drop in the success rate of actions of the robot.

BRIEF DESCRIPTION OF DRAWINGS

FIG. 7 is a diagram illustrating an example of clearance amount setting information.

FIG. 9B is a plan view of a box that has been set with clearances.

DESCRIPTION OF EMBODIMENTS

Figure 1:
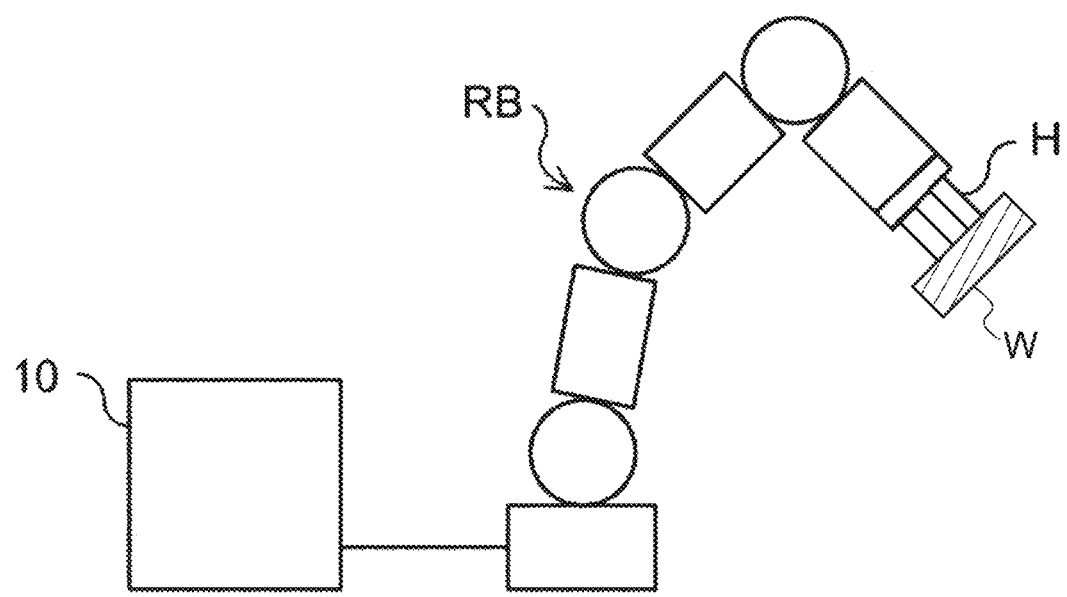
FIG. 1 is a diagram illustrating a schematic configuration of a robot and robot control device.

Explanation follows regarding an example of an exemplary embodiment of the present invention, with reference to the drawings. Note that the same or equivalent configuration elements and parts are appended with the same reference numerals in each of the drawings. The dimensional proportions illustrated in the drawings may be exaggerated in order to aid explanation, and do not necessarily conform to actual proportions.

FIG. 1 is a diagram illustrating schematic configurations of a robot and a robot control device.

As illustrated in FIG. 1, a robot control device 10 is connected to a robot RB, and controls actions of the robot RB. The robot control device 10 controls actions of the robot RB by outputting to the robot RB various parameters (action command values) to control actions of the robot RB. The robot control device 10 also includes a function as a path generation device to generate a path of the robot RB. The detailed configuration of the robot control device 10 will be described later.

The robot RB moves so as to follow either plural taught points taught by a user or plural waypoints generated from a path plan. The robot RB follows various action command values to move. The various action command values include, for example, speed, acceleration, deceleration, and rotation angles of joints of the robot RB.

As an example, a robot hand H is attached to a distal end of the robot RB as an end effector. In this case for example, the robot RB is what is referred to as a pick-and-place robot that grips a workpiece W configuring a manipulation target of the robot RB at a prescribed position, transports the workpiece W to a prescribed destination, and places the workpiece W there. As an alternative example, the robot RB may have a tool attached as an end effector. In such cases, the robot RB moves so as to follow a taught path or a path based on a path plan, and performs prescribed processing such as welding, screw fastening, or inspection at a prescribed location.

Before going on to explain the robot control device 10 in detail, explanation follows regarding a configuration of the robot RB. In the present exemplary embodiment, explanation is given regarding an example in which the robot RB is a vertical articulated multi-jointed robot. However, the present invention is also applicable to a horizontal multi-jointed robot (SCARA robot), a parallel link robot, an orthogonal robot, a mobile robot, a flying robot (drone), a humanoid robot, and the like.

Figure 2:
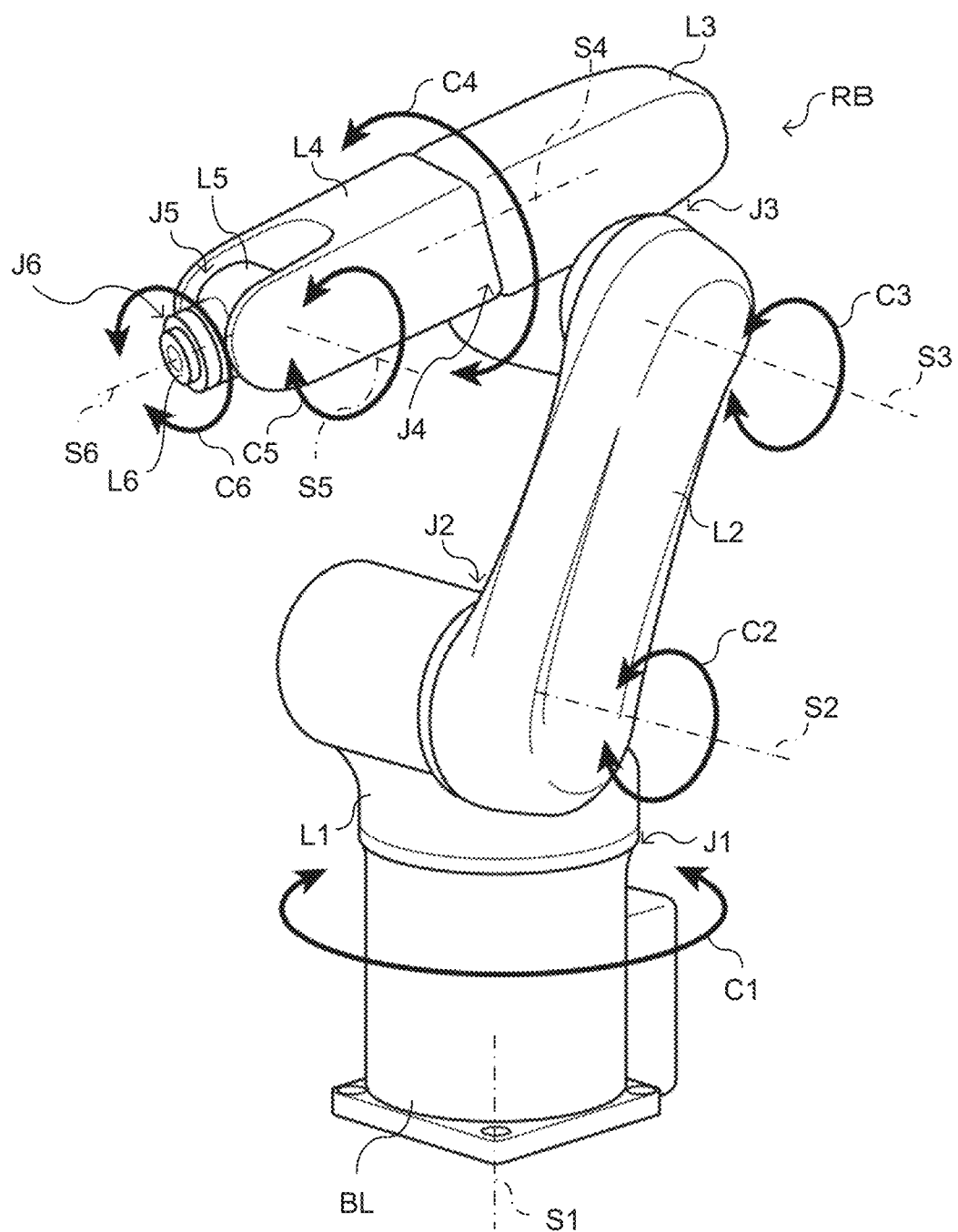
FIG. 2 is a diagram illustrating a configuration of a robot that is a vertical articulated robot.

FIG. 2 is a diagram illustrating a configuration of a robot that is a vertical articulated multi-jointed robot.

As illustrated in FIG. 2, the robot RB is a six-shaft robot with six degrees of freedom, and includes a base link BL, links L1 to L6, and joints J1 to J6. Note that the joints are joints that connect the links together. The joints J1 to J6 connect the respective links together so as to be capable of rotating with respect to each other powered by a non-illustrated motor. Although an example of a six-shaft robot is explained in the present exemplary embodiment, the number of shafts is not limited to six, and there may be any number of two or more shafts. The number of links would also change according to the number of shafts.

The base link BL and the link L1 are connected together through the joint J1 that rotates in the arrow C1 direction about a vertical shaft S1, as illustrated in FIG. 2. The link L1 accordingly rotates in the arrow C1 direction with the base link BL as the support.

The link L1 and the link L2 are connected together through the joint J2 that rotates in the arrow C2 direction about a horizontal shaft S2 in FIG. 2. Accordingly, the link L2 rotates in the arrow C2 direction with the joint J1 as the support.

The link L2 and the link L3 are connected together through the joint J3 that rotates in the arrow C3 direction about a shaft S3 in FIG. 2. The link L3 accordingly rotates in the arrow C3 direction with the joint J2 as the support.

The link L3 and the link L4 are connected together through the joint J4 that rotates in the arrow C4 direction about a shaft S4 in FIG. 2. The link L4 accordingly rotates in the arrow C4 direction with the joint J3 as the support.

The link L4 and the link L5 are connected together through the joint J5 that rotates in the arrow C5 direction about a shaft S5 in FIG. 2. The link L5 accordingly rotates in the arrow C5 direction with the joint J4 as the support.

The link L5 and the link L6 are connected together through the joint J6 that rotates in the arrow C6 direction about a shaft S6 in FIG. 2. The link L6 accordingly rotates in the arrow C6 direction with the joint J5 as the support. Note that although omitted from illustration in FIG. 2, the robot hand H is attached to the link L6.

The joints J1 to J6 are each set with a range of movement over a predetermined rotation angle range.

The position of fingers of the robot RB or the pose of the robot RB are determined by the rotation angles of each of the joints J1 to J6. In cases in which a path is taught to the robot RB, angle values for the rotation angles of each of the joints J1 to J6 are expressed as vectors of a dimension corresponding to the number of shafts of the robot (as six dimension vectors therefore in the present exemplary embodiment), and these vectors are taught in sequence as taught points. Similarly, in cases in which the path is not taught but generated, waypoints for the robot RB to pass through are generated as vectors of a dimension corresponding to the number of shafts of the joints J1 to J6. Note that sometimes vector data including coordinate values in an orthogonal coordinate system are given as an action path instead of vector data including angle values at taught points or waypoints. In such cases, the coordinates values in the orthogonal coordinate system may be converted into angle values of the joints J1 to J6 based on inverse kinematics of the robot.

Next, explanation follows regarding the robot control device 10.

Figure 3:
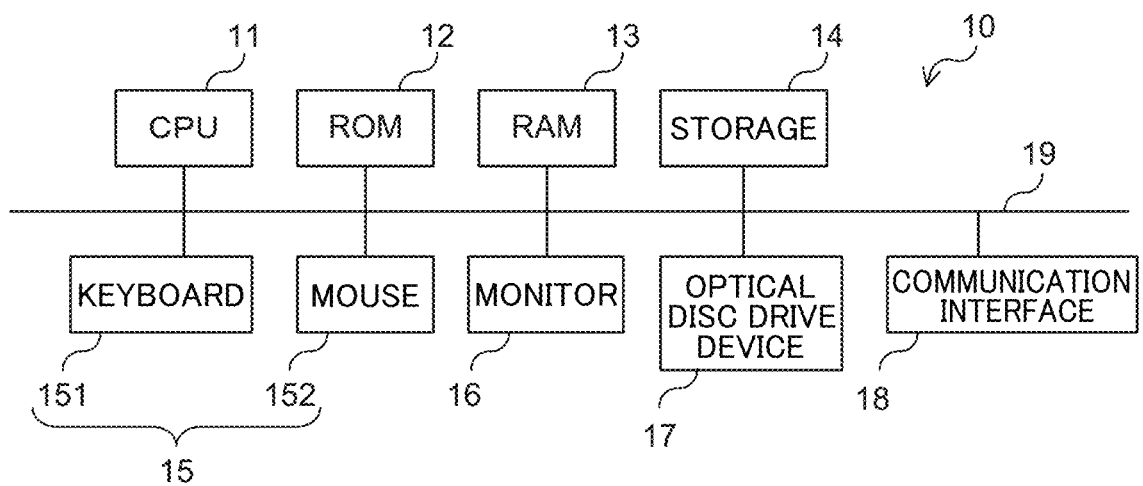
FIG. 3 is a block diagram illustrating a hardware configuration of a robot control device.

FIG. 3 is a block diagram illustrating a hardware configuration of the robot control device 10.

As illustrated in FIG. 3, the robot control device 10 includes a central processing unit (CPU) 11, read only memory (ROM) 12, random access memory (RAM) 13, storage 14, an input unit 15, a monitor 16, an optical disc drive device 17, and a communication interface 18. The respective configuration elements are connected together through a bus 19 so as to be capable of communicating with each other.

In the present exemplary embodiment, the ROM 12 or the storage 14 is stored with a robot control program for controlling the robot RB. The CPU 11 is a central processing unit that executes various programs and controls various configurations. Namely, the CPU 11 reads the program from the ROM 12 or the storage 14, and executes the program using the RAM 13 as a workspace. The CPU 11 controls the various configuration elements described above and performs various arithmetic processing according to the program recorded in the ROM 12 or the storage 14.

The ROM 12 is stored with various programs and various data. The RAM 13 serves as a workspace to temporarily store programs and data. The storage 14 is configured by a hard disk drive (HDD) or a solid state drive (SSD), and is stored with various programs including an operating system, and various data.

The input unit 15 includes a keyboard 151 and a pointing device such as a mouse 152, and is used to perform various input. The monitor 16 is, for example, configured by a liquid crystal display, and displays various information such as success or failure of suction of a workpiece W. The monitor 16 may also function as the input unit 15 if a touch panel is adopted. The optical disc drive device 17 performs reading of data stored on various recording media (such as CD-ROMs or Blu-ray discs) and writing of data to the recording media.

The communication interface 18 is an interface for communicating with other devices, and may employ a standard such as Ethernet (registered trademark), FDDI, or Wi-Fi (registered trademark).

Next, explanation follows regarding functional configuration of the robot control device 10.

Figure 4:
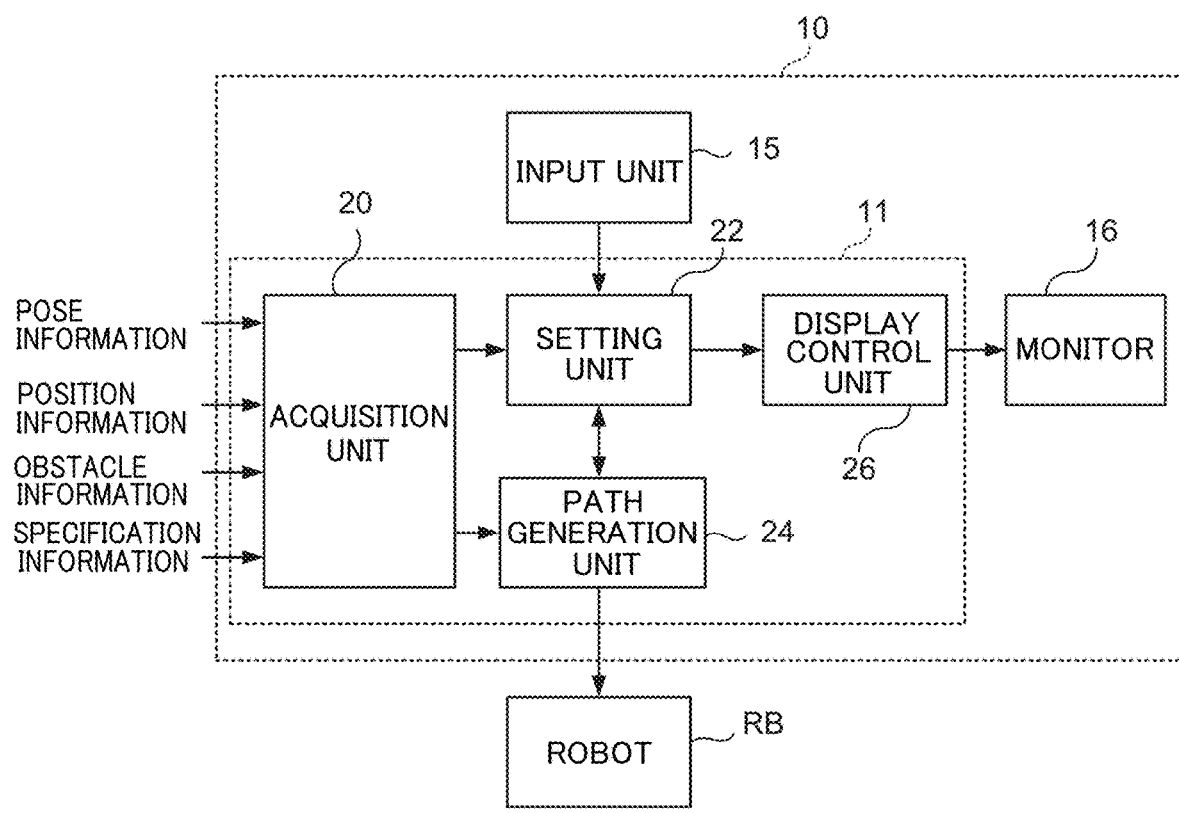
FIG. 4 is a block diagram illustrating an example of a functional configuration of a robot control device.

FIG. 4 is a block diagram illustrating an example of functional configuration of the robot control device 10.

As illustrated in FIG. 4, functional configuration of the robot control device 10 includes an acquisition unit 20, a setting unit 22, a path generation unit 24, and a display control unit 26. The respective functional configuration elements are implemented by the CPU 11 reading the robot control program stored in the ROM 12 or the storage 14, expanding the robot control program in the RAM 13, and executing the robot control program.

The acquisition unit 20 acquires pose information, position information, obstacle information, and specification information. These information may be acquired by reading information pre-stored on the storage 14, or may be acquired from an external device.

The pose information is information related to an initial pose and a target pose of the robot RB.

The position information is information related to the position of the robot RB, and includes, for example, coordinate values of a position of the robot RB in three-dimensional space.

Figure 5:
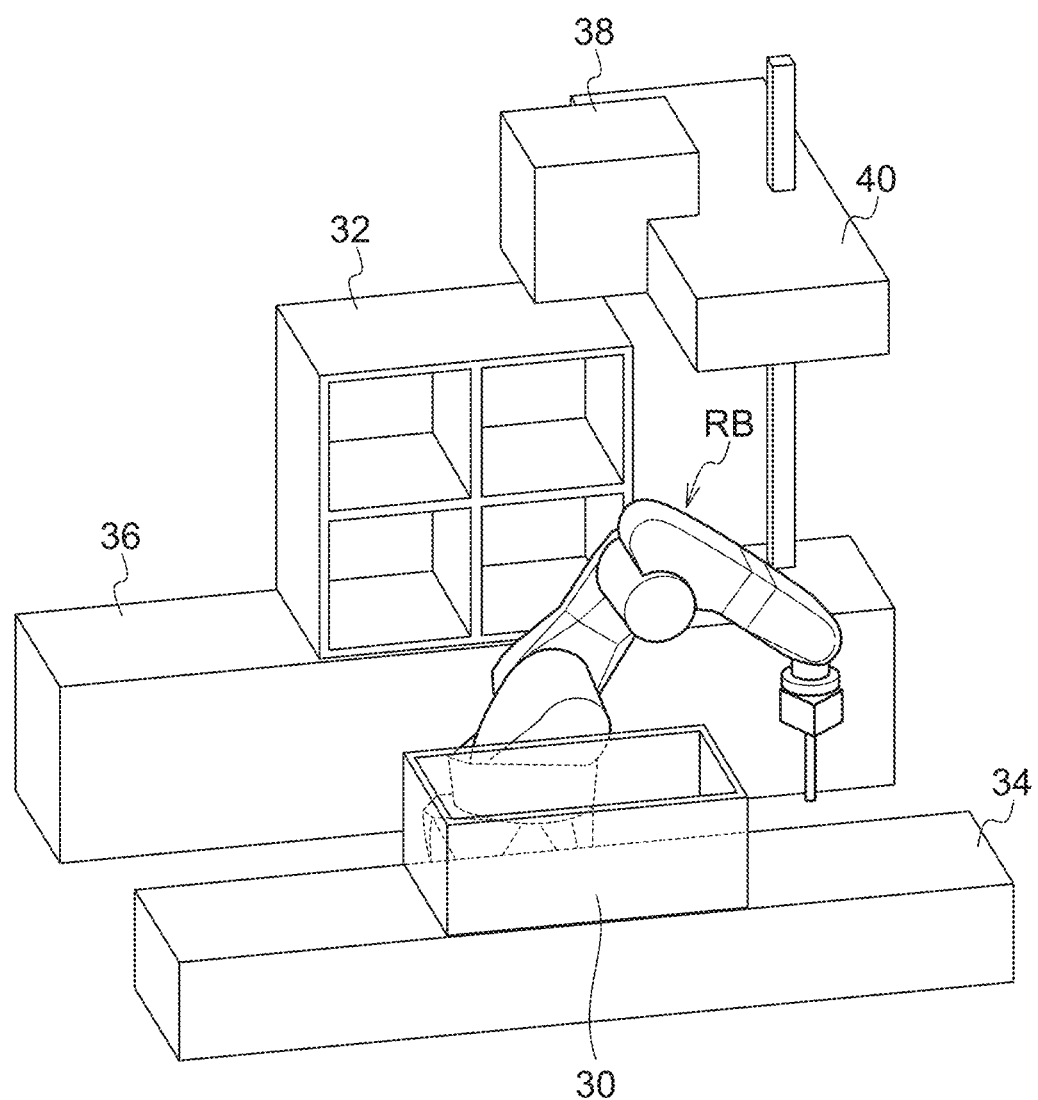
FIG. 5 is a diagram to explain types of obstacles.

The obstacle information is information including a position of obstacles present in a range to interfere with the robot RB, namely a position of structural objects that may obstruct an action of the robot RB, including, for example, coordinate values of the position of an obstacle in three-dimensional space. Interference here means contacting the robot RB. In the present exemplary embodiment, as illustrated in FIG. 5, an example will be explained of a case in which the robot control device 10 is applied to a pick-and-place device. Examples of types of obstacle include a box 30 for containing workpieces, a shelf 32 for placing workpieces on, a pedestal 34 to set the box 30 on, a pedestal 36 to set the shelf 32 on, a camera 38 for imaging actions of the robot RB, and a camera stand 40 that the camera 38 is attached to. Moreover, the obstacle information in the present exemplary embodiment also includes, other than information relating to the position of the obstacle, for example, three-dimensional shape data representing a three-dimensional shape and size of the obstacle or a type of the obstacle.

The specification information is information relating to the specification of the robot RB including the shape thereof. As an example in the present exemplary embodiment, the specification information includes, as well as the shape of each of the joints J1 to J6 of the robot RB, information representing the specification such as the maximum speed, maximum acceleration, maximum deceleration, an angle range of adoptable rotation angles, and the like of each of the joints J1 to J6.

Based on the positional relationship between the robot RB and the obstacle, the setting unit 22 sets a clearance amount for at least one out of the robot RB or the obstacle present inside a range of interference with the robot RB. The clearance amount represents an amount of clearance to avoid the interference between the robot RB and an obstacle.

Note that a clearance amount may be set for the robot RB overall, or separate individual clearance amounts may be set for each joint of the joints J1 to J6. In the present exemplary embodiment explanation follows regarding an example of a case in which separate individual clearance amounts are set for each of the joints.

Moreover, the clearance amounts may be set for the robot RB alone, a clearance amount may be set for the obstacle alone, or clearance amounts may be set for both the robot RB and the obstacle. Moreover, in cases in which there are plural obstacles present, a clearance amount may be set for all the obstacles, or a clearance amount may be set for only some of the obstacles.

The path generation unit 24 generates path information related to the path of the robot RB based on the initial pose and the target pose of the robot RB, the position of the robot RB, the position of the obstacle, the shape of the robot, and on the clearance amounts set by the setting unit 22. The path information is information related to a path from the initial pose of the robot RB to the target pose, and to the speed the robot RB moves on the path. The path is a list of poses adopted when the robot RB performs an action from the initial pose to the target pose. The pose of the robot RB is determined by the angle values of the rotation angles of the joints J1 to J6, and so the path is configured by a list of angle values for the rotation angles of the joints J1 to J6 at each of the taught points or waypoints of the robot RB from the initial pose to the target pose of the robot RB.

Moreover, the information related to speed is, for example, a speed profile representing changes in speed when an action of the robot RB is performed from the initial pose to the target pose. The robot RB moves along the path at the speed controlled so as to follow the speed profile.

The display control unit 26 executes various display control processing such as displaying the robot RB and obstacles set with the clearance amounts on a monitor 16 or the like.

Explanation follows regarding operation of the robot control device 10.

Figure 6:
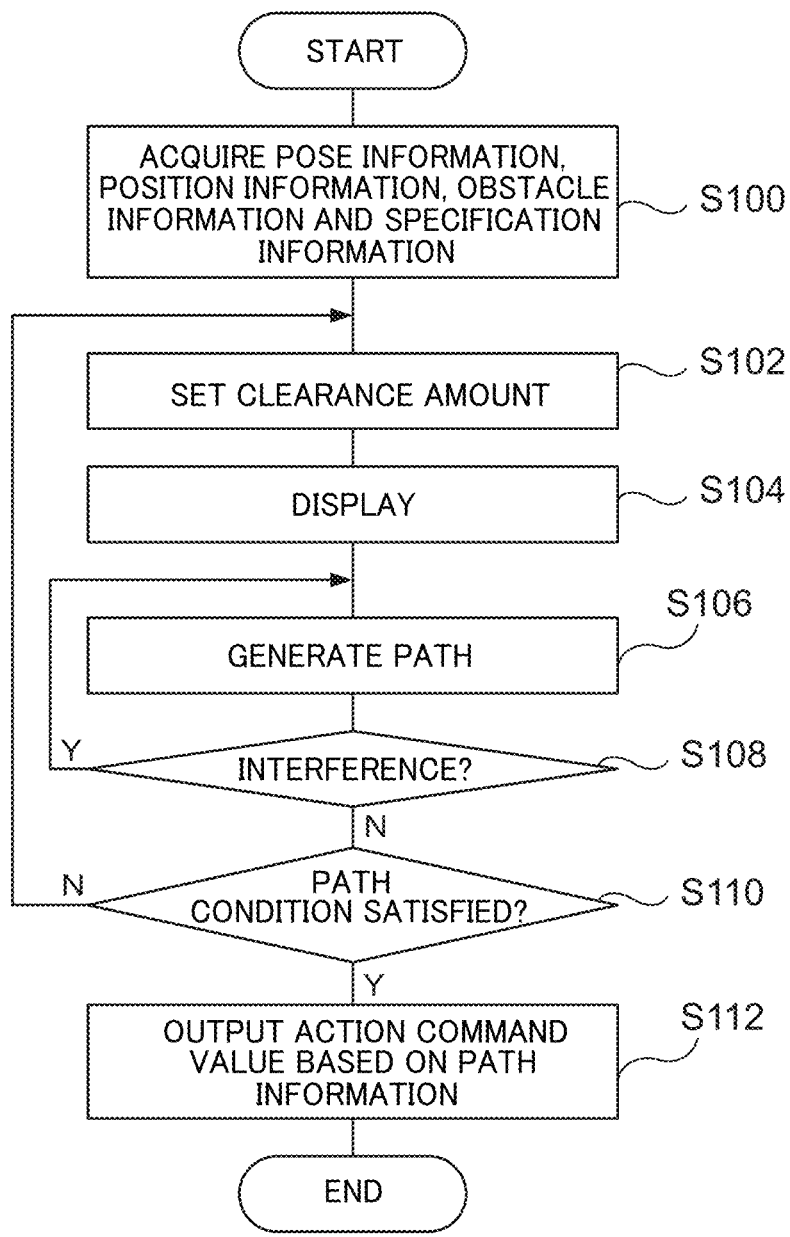
FIG. 6 is a flowchart illustrating a flow of robot control processing by a robot control device.

FIG. 6 is a flowchart illustrating a flow of robot control processing by the robot control device 10. The CPU 11 reads the robot control program from the ROM 12 or the storage 14, expands the robot control program in the RAM 13, and executes the robot control program in order to perform the robot control processing. Note that path generation processing is included in the robot control processing.

The CPU 11 functions as the acquisition unit 20 to acquire the robot RB pose information, the robot RB position information, the obstacle information related to obstacles, and the robot RB specification information (step S100).

For at least one out of the robot RB or an obstacle present in a range of interference with the robot RB, the CPU 11 sets separate individual clearance amounts representing amounts of clearance to avoid interference between the robot RB and obstacles (step S102).

Explanation follows regarding a method to set the clearance amounts.

First, for example, separate individual clearance amounts may be set by a user. In such cases, for example, the display control unit 26 displays the robot RB on the monitor 16 based on the specification information and also displays the obstacle on the monitor 16 based on the obstacle information. Then the user uses the input unit 15 to input clearance amounts based on the positional relationship between the robot RB and the obstacle for at least one of each of the joints of the robot RB or the obstacle. The clearance amounts can thereby be set for at least one out of the robot RB or the obstacle.

Alternatively, for example as illustrated in FIG. 7, the clearance amounts may be set automatically according to clearance amount setting information 50. As illustrated in FIG. 7, the clearance amount setting information 50 is table data representing correspondence relationships between subjects of clearance setting and clearance amounts. As illustrated in FIG. 7, the clearance amounts are set for each of the joints J1 to J6 in the case of the robot RB. The clearance amounts for the joints J1 to J3 that are the joints on the base side are set to 10 mm. Note that setting the clearance amount of 10 mm for the joint J1 means that the joint J1 is enlarged by a 10 mm thickness in a direction normal to the surface thereof.

On the other hand, the clearance amounts of the joints J4 to J6 that are the joints on the distal side are set to 5 mm. Namely, the clearance amounts on the distal side are set smaller than the clearance amounts of the joints on the base side. There is a possibility that the joints J4 to J6 on the distal side might be thrust into the box 30 of FIG. 5 or into a cavity portion of an obstacle having a cavity such as the shelf 32. Thus were a large clearance amount to be set then sometimes a pick-up of a workpiece present in a corner of the box 30, for example, would fail. The clearance amounts for the joints J4 to J6 on the distal side are accordingly set smaller than the clearance amounts of the joints J1 to J3 on the base side. Moreover, as illustrated in FIG. 7, in contrast to the clearance amount set to 10 mm for the camera stand 40, the clearance amounts of the box 30 and the shelf 32 are set at 5 mm, i.e. smaller than for the camera stand 40. In this manner, the clearance amount setting information 50 sets the clearance amounts based on the positional relationship between the robot RB and the obstacles. The success rate of pick-up of workpieces can thereby be prevented from dropping.

Next, description follows regarding another method to set the clearance amounts. First, for example, based on the pose information of the robot RB, the robot RB position information, the obstacle information related to obstacles, and the robot RB specification information acquired at step S100, the path generation unit 24 generates path information for a path from the initial pose to the target pose and then executes a simulation of action performed by the robot RB according to the generated path information. The setting unit 22 may set a clearance amount for at least one out of the robot RB or the obstacle according to the results of simulation execution. More specifically, joints that thrust into an obstacle having a cavity such as the box 30 or the shelf 32 for example are identified, and the clearance amount of joints that thrust into an obstacle is set smaller than a clearance amount for joints not thrust into an obstacle. Namely, the clearance amounts are set based on the positional relationship between the robot RB and the obstacles. Moreover, an alternative approach that may be adopted is to generate path information by processing similar to that of step S106 described later, to compute accelerations of the joints based on the generated path information, and to make clearance amounts larger in cases in which the computed acceleration is a predetermined threshold or greater so as to make the acceleration less than the predetermined threshold. The robot RB can thereby perform an action more safely. Note that the speed of the joints may be computed instead of the acceleration, and the clearance amount set based on the compute speed.

Figure 8:
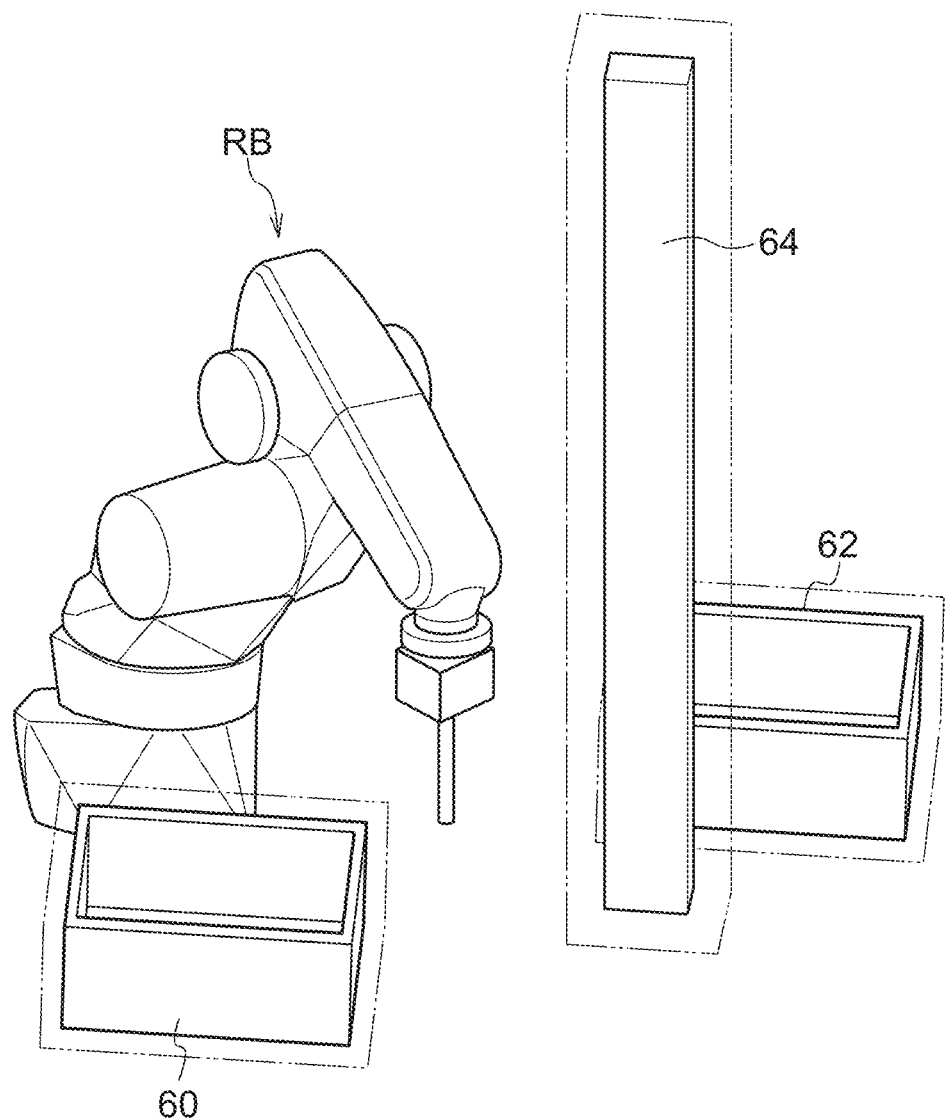
FIG. 8 is a diagram to explain an example of display of clearance amounts.
Figure 9A:
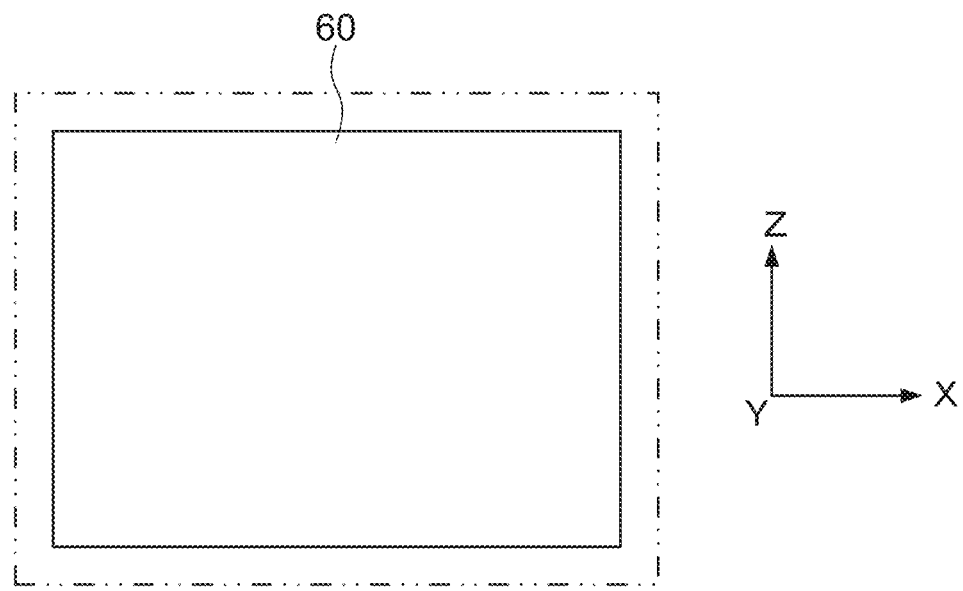
FIG. 9A is a side view of a box that has been set with a clearance.

The CPU 11 functions as the display control unit 26 to display the robot RB and the obstacles on the monitor 16 based on the specification information and the obstacle information acquired at step S100 (step S104). This display is performed so as to enable awareness to be given of the clearances set at the clearance amounts set at step S102. FIG. 8 illustrates an example of a display of obstacles set with clearances. In the example of FIG. 8, separate individual clearance amounts have been set for boxes 60, 62 and for a support column 64, with regions where the clearances have been set indicated by double-dot broken lines. In the example illustrated in FIG. 8, the clearance amount for the box 60 that includes a cavity and is for containing workpieces and the clearance amount for the box 62 for placing workpieces on are smaller than the clearance amount of the support column 64 lacking a cavity. Note that both the boxes 60, 62 include cavities. Thus, for example, clearance is not only set at the outside of the box 60 as illustrated in FIG. 9A of the box 60 as viewed from the side, but a clearance is also set at the inside of the box 60 as illustrated in FIG. 9B of the box 60 as viewed from above.

Figure 10:
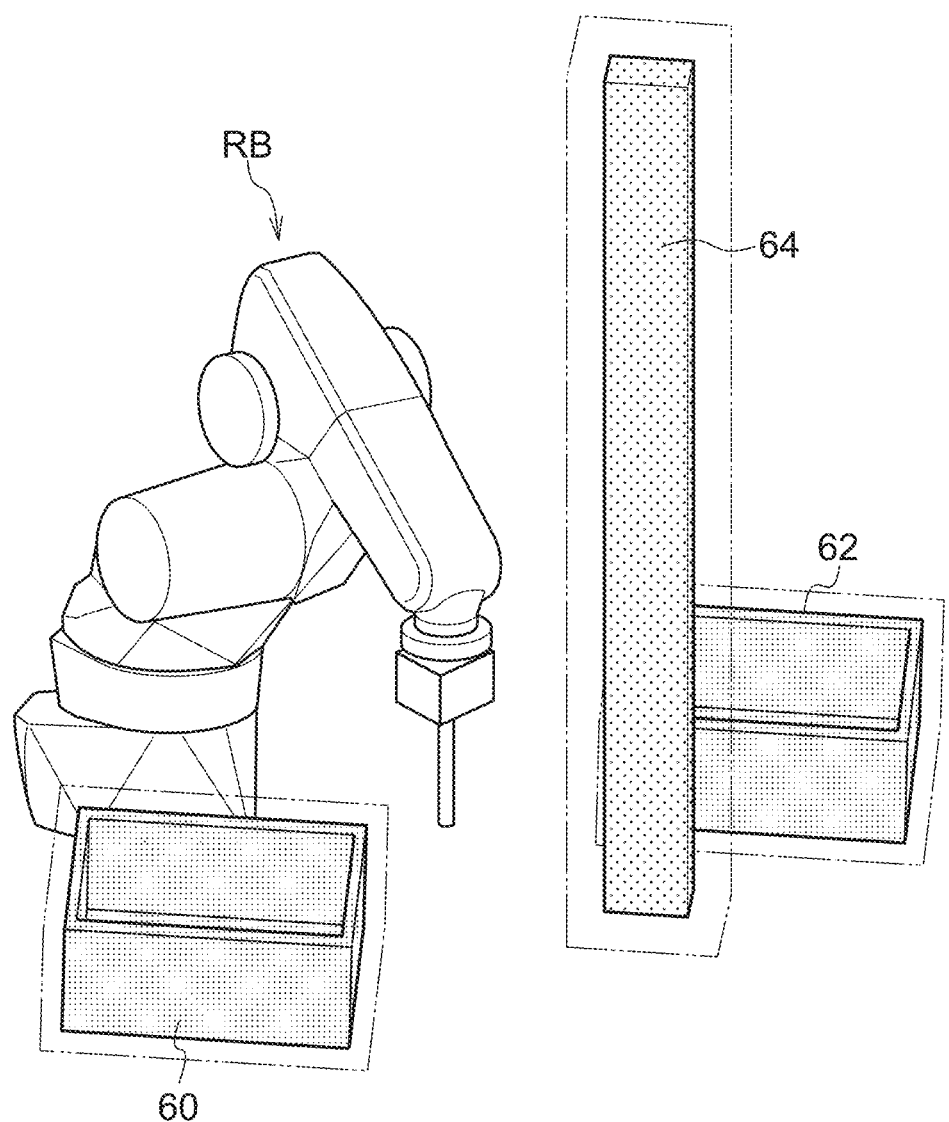
FIG. 10 is a diagram illustrating an example of a display for a case in which display is differentiated according to clearance amount.

Note that the display of obstacles may be controlled so as to be differentiated according to the clearance amount. For example, as illustrated in FIG. 10, the clearance amounts of the boxes 60, 62 may be differentiated by making the color of the boxes 60, 62 different to the color of the support column 64 for a case in which the clearance amount of the boxes 60, 62 is smaller than the clearance amount of the support column 64. Such an approach enables easy awareness to be given that different clearance amounts have been set.

Figure 11:
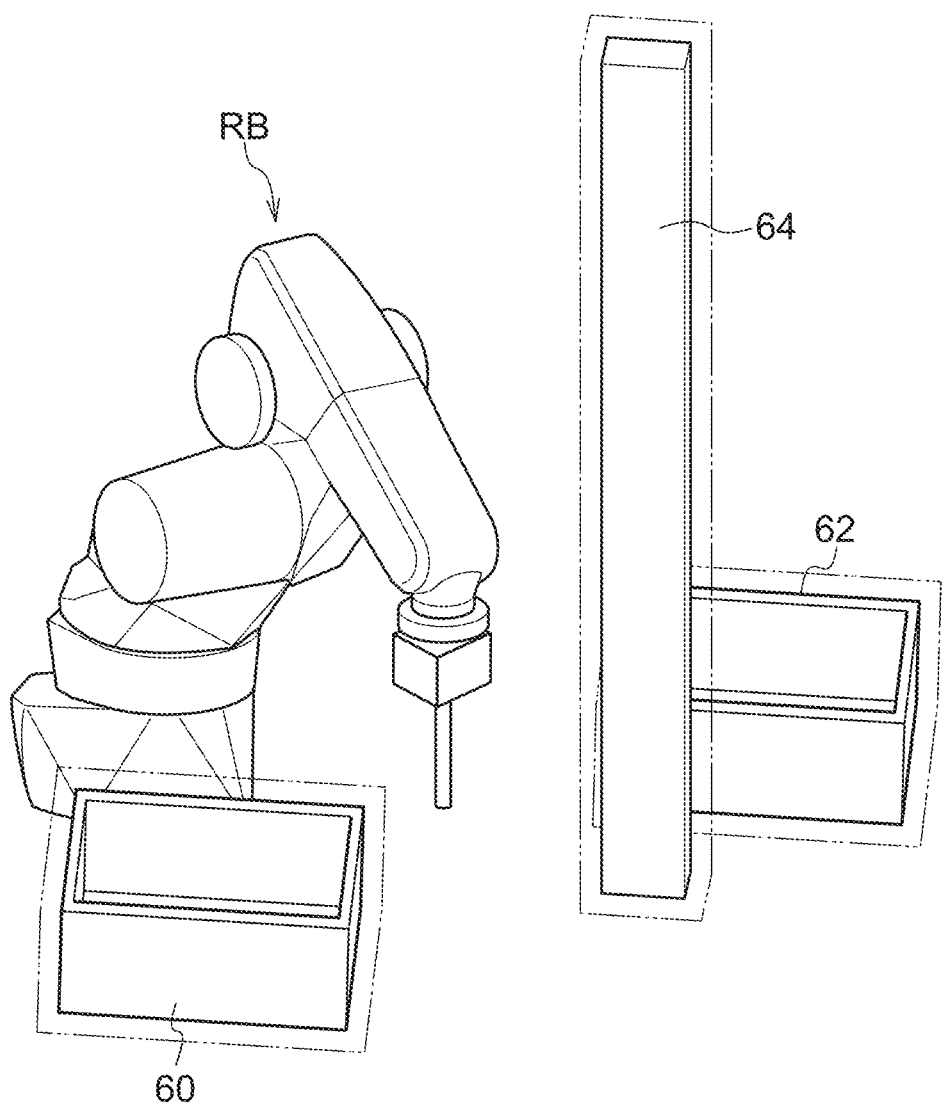
FIG. 11 is a diagram to explain a case in which a clearance amount is set to the same in each instance.

Alternatively a clearance amount set for one obstacle may be set the same in each instance for other obstacles. For example as illustrated in FIG. 11, setting may be performed such that the clearance amount set for the support column 64 is set the same in each instance for the boxes 60, 62.

Figure 12A:
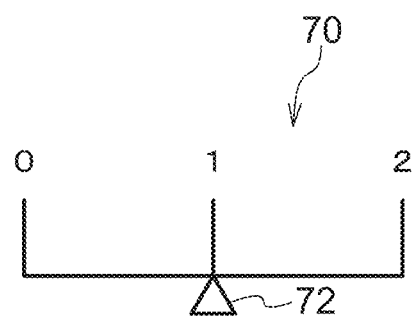
FIG. 12A is a diagram illustrating an example of a reception screen to receive an adjustment coefficient.

Moreover, the setting unit 22 may receive adjustment coefficients to adjust clearance amount, so as to adjust with plural clearance amounts based on the received adjustment coefficients. For example as illustrated in FIG. 12A, a reception screen 70 to receive adjustment coefficients may be displayed on the monitor 16. In the example illustrated in FIG. 12A, the adjustment coefficients are settable in a range of from 0 to 2 by manipulation to slide an adjustment bar 72 left or right. Note that there is no limitation to this as the settable range for the adjustment coefficients and any suitable setting may be performed. When an adjustment coefficient has been received, the setting unit 22 multiplies the clearance amount by the adjustment coefficient, and sets the resulting value as the clearance amount after adjustment.

For example, in FIG. 12A the adjustment coefficient is set to "1". There is accordingly no change to each of the clearance amounts when the clearance amounts are set for the robot RB and the obstacles, for example as illustrated in FIG. 7.

Figure 12B:
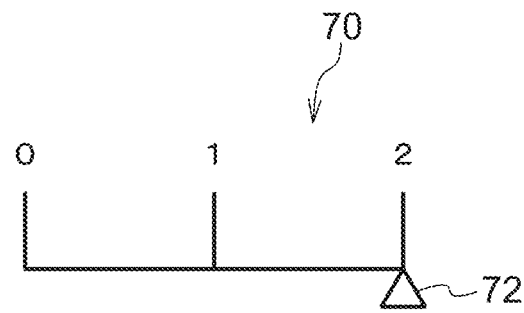
FIG. 12B is a diagram illustrating an example of a reception screen to receive an adjustment coefficient.

In FIG. 12B the adjustment coefficient is set to "2". The clearance amount of the box as in the example illustrated in FIG. 7 is accordingly multiplied by 2 to give 10 mm, and the clearance amount of the camera stand is also multiplied by 2 to give 20 mm. The other clearance amounts are also similarly multiplied by 2.

Figure 12C:
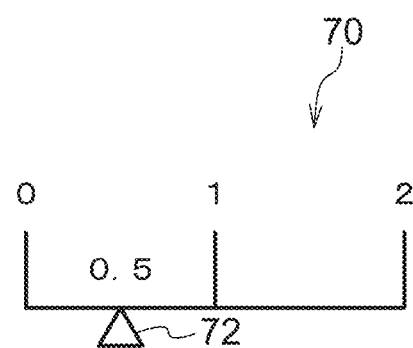
FIG. 12C is a diagram illustrating an example of a reception screen to receive an adjustment coefficient.

In FIG. 12C the adjustment coefficient is set to "0.5". The clearance amount of the box as in the example illustrated in FIG. 7 is accordingly multiplied by 0.5 to give 2.5 mm, and the clearance amount of the camera stand is also multiplied by 0.5 to give 5 mm. The other clearance amounts are also similarly multiplied by 0.5.

The thereby enables adjustment with plural clearance amounts by setting the adjustment coefficient.

The CPU 11 functions as the path generation unit 24 and, based on the pose information, position information, obstacle information, and specification information acquired at step S100 and on the clearance amounts set at step S102, generates path information (step S106) related to the path and speed of the robot RB.

Various known methods may be applied as a path generation method. Examples of methods that may be applied as the path generation method include a rapidly exploring random tree (RRT), RRT*, this being an improved version of RRT, RRT connect, a probabilistic roadmap method (PRM), stochastic trajectory optimization for motion planning (STOMP), covariant Hamiltonian optimization for motion planning (CHOMP), an exploring/exploiting tree (EET), or the like.

The CPU 11 functions as the path generation unit 24 and, based on the path information and obstacle information generated at step S100, determines whether or not on the path generated at step S106 the robot RB would interfere with the obstacles (step S108). The determination of interference may, for example, employ known interference determination technology for determining interference between the robot RB and the obstacle. An example of such known interference determination technology is the technology described in Japanese Patent Application Laid-Open (JP-A) No. 2002-273675 and this may be employed.

Processing transitions to step S110 in cases in which the robot RB is determined not to interfere with the obstacles (step S108: NO). On the other hand processing transitions to step S106 in cases in which the robot RB would interfere with the obstacles (step S108: YES), and a path is re-generated so that the robot RB does not interfere with the obstacles. The processing of steps S106 and S108 is performed repeatedly until the robot RB no longer interferes with the obstacles.

The CPU 11 functions as the path generation unit 24 and determines whether or not the path generated at step S106 satisfies a predetermined path condition (step S110). An example of the path condition being satisfied is a case in which a path length of the path does not exceed a predetermined standard path length. The path length referred to here is a length of the path from the initial pose to the target pose as generated at step S106. The standard path length may, for example, be a value computed by adding a predetermined margin to a path length of a path taught by teaching, or may be a value computed by adding a predetermined margin to a path length of a path when no clearances are set. This enables the path length to be prevented from becoming too long.

Note that cases in which the action time for the path does not exceed a predetermined standard action time may be employed as case in which the path condition is satisfied. The action time of the path is the time for the robot RB to move from the initial pose to the target pose along the path generated at step S106. Moreover, the standard action time may, for example, be a value computed by adding a predetermined margin to an action time for a path taught by teaching, or may be a value computed by adding a predetermined margin to an action time for a path when no clearances are set. This enables the action time of the robot RB to be prevented from becoming too long.

Moreover, the path condition being satisfied may defined as cases in which both the path length of the path does not exceed the standard path length and also the action time for the path does not exceed the standard action time.

Moreover, processing transitions to step S112 in cases in which the path generated at step S106 satisfies the predetermined path condition. On the other hand, processing transitions to step S102 in cases in which the path generated at step S106 does not satisfy the predetermined path condition, and the clearance amounts are then re-set. Namely the clearance amounts are made smaller. Then the processing of steps S102 to S110 is performed repeatedly until the generated path length satisfies the predetermined path condition.

At step S112, an action command value based on the generated path information is output to the robot RB. The robot RB thus performs an action according to the path information.

Thus in the present exemplary embodiment the clearance amounts are set separately and individually for at least one of the robot RB or the obstacle. This enables a drop in safety of robot action to be prevented while also preventing a drop in success rate of robot action, compared to case in which the clearance amount is set the same in each instance.

Note that although a case has been described in the present exemplary embodiment in which the obstacle information is acquired, the obstacle information related to obstacles such the box 30, the shelf 32, and the like may, for example, be generated based on captured images imaged with the camera 38 illustrated in FIG. 5. In such cases, the camera 38 may be a camera that captures two-dimensional images, or a camera that captures three-dimensional images.

The acquisition unit 20 acquires captured images imaged with the camera 38. The setting unit 22 generates obstacle information based on the acquired captured images, and sets the clearance amounts based on the generated obstacle information. The generation of the obstacle information may employ any known technique such as template matching or the like.

Thus setting the clearance amounts based on the obstacle information generated based on the captured images imaged by the camera 38 means that there is no need to always prepare obstacle information in advance.

Moreover, for clearance amounts set at step S102 of FIG. 6, the clearance amounts may be adjusted according to at least one factor out of the weight or size of the workpiece. For example adjustment may be performed such that the clearance amount is made larger as the weight of the workpiece gets heavier, and the clearance amount is made smaller as the weight of the workpiece gets lighter. Moreover, adjustment may be performed such that the clearance amount is set larger as the size of the workpiece gets larger, or such that the clearance amount is made smaller as the size of the workpiece gets smaller.

Moreover, although a case has been explained in the present exemplary embodiment in which the robot RB subject to control of the robot control device is an actual device, the control subject of the robot control device may be a robot performing an action in a simulation.

The robot control processing executed by the CPU reading software (a program) in the exemplary embodiments described above may be executed by various types of processor other than the CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The robot control processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, although the robot control program is pre-stored (pre-installed) in the storage 14 or the ROM 12 in the exemplary embodiments described above, there is no limitation thereto. This program may be provided in a format recorded on a recording medium such as compact disc read only memory (CD-ROM), digital versatile disc read only memory (DVD-ROM), or universal serial bus (USB) memory. Alternatively, the program may be provided in a format downloadable from an external device over a network.

EXPLANATION OF THE REFERENCE NUMERALS 10 robot control device
20 acquisition unit
22 setting unit
24 path generation unit
26 display control unit
30, 60, 62 box
32 shelf
38 camera
40 camera stand
50 clearance amount setting information
64 support column
70 reception screen
72 adjustment bar

The invention claimed is:

1. A path generation device connected with a robot, comprising:
a central processing unit (CPU); and
a memory storing one or more programs, when executed by the CPU, cause the path generation device to:
acquire pose information relating to an initial pose and a target pose of the robot, position information relating to a position of the robot, obstacle information including a position of an obstacle present in a range of interference with the robot, and specification information relating to a specification including a shape of the robot;
based on a positional relationship between the robot and the obstacle, automatically set a clearance amount representing an amount of clearance to avoid interference for at least one of the robot or the obstacle, wherein the robot includes a plurality of joints, clearance amounts for joints on a distal side of the robot are set smaller than clearance amounts for joints on a base side of the robot, wherein the one or more programs, when executed by the CPU, cause the path generation device to set, among the plurality of joints of the robot, that clearance amounts of joints that thrust into an obstacle having a cavity is smaller than clearance amounts of joints that do not thrust into the obstacle having the cavity;
generate path information related to a path of the robot based on the initial pose and the target pose of the robot, the position of the robot, the position of the obstacle, the shape of the robot, and the clearance amount set; and
control the robot using the generated path information to adjust speed, acceleration, deceleration and rotation angle of the robot such that the robot performs prescribed processing along the path without the interference with the obstacle.

2. The path generation device of claim 1, wherein when the generated path does not satisfy a predetermined path condition, the one or more programs, when executed by the CPU, cause the path generation device to:
reduce the clearance amount; and
regenerate the path information based on the initial pose and the target pose of the robot, the position of the robot, the position of the obstacle, the shape of the robot, and the clearance amount set by the setting unit.

3. The path generation device of claim 1, wherein when the obstacle includes the cavity and the obstacle is for containing a workpiece subject to manipulation by the robot or for placing the workpiece on, the one or more programs, when executed by the CPU, cause the path generation device to: set a smaller clearance amount than a clearance amount for an obstacle not including the cavity.

4. The path generation device of claim 1, wherein the one or more programs, when executed by the CPU, cause the path generation device to: compute a speed or acceleration of each of the plurality of joints of the robot based on the path information, and in a case in which the computed speed or acceleration of each of the plurality of joints of the robot is a predetermined threshold or higher, increase the clearance amount such that the speed or acceleration becomes less than the predetermined threshold.

5. The path generation device of claim 1, wherein the one or more programs, when executed by the CPU, cause the path generation device to: adjust a plurality of the clearance amounts based on an adjustment coefficient to adjust the clearance amount.

6. The path generation device of claim 1, further comprising a display control unit configured to effectively be controlled so as to differentiate a display of the obstacle in accordance with the clearance amount.

7. The path generation device according to claim 1, wherein a clearance amount for each joint of the robot represents a safe distance between each joint of the robot and the obstacle.

8. The path generation device according to claim 1, wherein the clearance amounts for joints on a distal side of the robot are set smaller than clearance amounts for joints on a base side of the robot in order to prevent failure in picking a workpiece.

9. A path generation method executed by a central processing unit (CPU) of a path generating device connected with a robot, comprising:
acquiring pose information relating to an initial pose and a target pose of the robot, position information relating to a position of the robot, obstacle information including a position of an obstacle present in a range of interference with the robot, and specification information relating to a specification including a shape of the robot;
based on a positional relationship between the robot and the obstacle, automatically setting a clearance amount representing an amount of clearance to avoid interference for at least one of the robot or the obstacle, wherein the robot includes a plurality of joints, clearance amounts for joints on a distal side of the robot are set smaller than clearance amounts for joints on a base side of the robot, the setting the clearance amount representing an amount of clearance to avoid interference for at least one of the robot or the obstacle including: setting, among the plurality of joints of the robot, that clearance amounts of joints that thrust into an obstacle having a cavity is smaller than clearance amounts of joints that do not thrust into the obstacle having the cavity;
generating path information related to a path of the robot based on the initial pose and the target pose of the robot, the position of the robot, the position of the obstacle, the shape of the robot, and the clearance amount set; and
controlling the robot using the generated path information to adjust speed, acceleration, deceleration and rotation angle of the robot such that the robot performs prescribed processing along the path without the interference with the obstacle.

10. The path generation method according to claim 9, wherein a clearance amount for each joint of the robot represents a safe distance between each joint of the robot and the obstacle.

11. The path generation device according to claim 9, wherein the clearance amounts for joints on a distal side of the robot are set smaller than clearance amounts for joints on a base side of the robot in order to prevent failure in picking a workpiece.

12. A non-transitory recording medium storing one or more programs, when executed by a central processing unit (CPU) of a path generating device connected with a robot, to perform processing, the processing comprising:
acquiring pose information relating to an initial pose and a target pose of the robot, position information relating to a position of the robot, obstacle information including a position of an obstacle present in a range of interference with the robot, and specification information relating to a specification including a shape of the robot;
based on a positional relationship between the robot and the obstacle, setting a clearance amount representing an amount of clearance to avoid interference for at least one of the robot or the obstacle, wherein the robot includes a plurality of joints, clearance amounts for joints on a distal side of the robot are set smaller than clearance amounts for joints on a base side of the robot, the setting a clearance amount representing an amount of clearance to avoid interference for at least one of the robot or the obstacle including: setting, among the plurality of joints of the robot, that clearance amounts of joints that thrust into an obstacle having a cavity is smaller than clearance amounts of joints that do not thrust into the obstacle having the cavity;
generating path information related to a path of the robot based on the initial pose and the target pose of the robot, the position of the robot, the position of the obstacle, the shape of the robot, and the clearance amount set; and
controlling the robot using the generated path information to adjust speed, acceleration, deceleration and rotation angle of the robot such that the robot performs prescribed processing along the path without the interference with the obstacle.

* * * * *